United States Patent
Salehi-Bakhtiari et al.

(10) Patent No.: US 9,903,516 B2
(45) Date of Patent: Feb. 27, 2018

(54) PRESS FITTING AND JOINT ASSEMBLY WITH SUCH A PRESS FITTING

(71) Applicant: King Industrial Limited, Wanchai, Hong Kong (CN)

(72) Inventors: Manouchehr Salehi-Bakhtiari, Cordova (ES); Steven Paul Webb, Tipton (GB)

(73) Assignee: CONEX IPR LIMITED, Kingswinford (GB)

(*) Notice: Subject to any disclaimer, the term of this patent is extended or adjusted under 35 U.S.C. 154(b) by 1191 days.

(21) Appl. No.: 14/037,330

(22) Filed: Sep. 25, 2013

(65) Prior Publication Data

US 2014/0021719 A1    Jan. 23, 2014

Related U.S. Application Data

(63) Continuation-in-part of application No. PCT/EP2012/063516, filed on Jul. 10, 2012.

(51) Int. Cl.
*F16L 21/03*     (2006.01)
*F16L 13/14*     (2006.01)
*F16L 37/091*    (2006.01)

(52) U.S. Cl.
CPC ........... *F16L 21/03* (2013.01); *F16L 13/142* (2013.01); *F16L 37/091* (2013.01)

(58) Field of Classification Search
USPC ......... 285/345, 349, 374, 399; 277/615–615, 277/626
See application file for complete search history.

(56) References Cited

U.S. PATENT DOCUMENTS

| | | | |
|---|---|---|---|
| 3,507,505 A * | 4/1970 | Jirka | B29C 57/025 277/625 |
| 4,368,894 A | 1/1983 | Parmann | |
| 4,394,024 A * | 7/1983 | Delhaes | F16L 17/035 277/619 |
| 5,108,134 A | 4/1992 | Irwin | |

(Continued)

FOREIGN PATENT DOCUMENTS

| | | | |
|---|---|---|---|
| DE | 3202367 A1 * | 10/1982 | F16L 37/0842 |
| DE | 20 2005 004 524 U1 | 7/2005 | |

(Continued)

OTHER PUBLICATIONS

International Search Report and Written Opinion dated Jan. 28, 2013, in corresponding International Application No. PCT/EP2012/063516, filed Jul. 10, 2012, 9 pages.

*Primary Examiner* — Aaron Dunwoody
*Assistant Examiner* — Fannie Kee
(74) *Attorney, Agent, or Firm* — Jones Day (57) ABSTRACT

A press fitting includes a socket defining at one end an opening for insertion of an end of a tube, a sealing ring within the socket, and a gripping ring within the socket, arranged in front of the sealing ring in the direction of insertion of the tube, wherein the gripping ring is provided with at least two weakening features in the form of notches, being reducible in size by deforming the gripping ring when applying a pressing action on the socket such that an inner diameter D2 of the gripping ring is reduced. A joint assembly may include such a press fitting having a tube inserted therein.

20 Claims, 6 Drawing Sheets

(56) References Cited

U.S. PATENT DOCUMENTS

| | | | | |
|---|---|---|---|---|
| 5,527,073 | A | * | 6/1996 | Readman .............. F16L 37/091 |
| | | | | 285/321 |
| 5,692,784 | A | * | 12/1997 | Hama ................. F16L 37/0915 |
| | | | | 285/105 |
| 2003/0067170 | A1 | | 4/2003 | Snyder, Sr. |
| 2005/0248152 | A1 | | 11/2005 | Viegener |
| 2007/0232147 | A1 | | 10/2007 | Herberg |
| 2010/0164222 | A1 | | 7/2010 | Schreckenberg |
| 2012/0001414 | A1 | | 1/2012 | Arning |

FOREIGN PATENT DOCUMENTS

| | | |
|---|---|---|
| EP | 0 989 348 B1 | 3/2000 |
| EP | 1 593 899 B1 | 11/2005 |
| EP | 1 756 462 B1 | 2/2007 |
| EP | 1 840 434 A2 | 10/2007 |

\* cited by examiner

SECTION A-A

PRESS FITTING AND JOINT ASSEMBLY WITH SUCH A PRESS FITTING

FIELD

The present disclosure pertains to a press fitting and a joint assembly with a press fitting.

BACKGROUND

EP 1 756 462 B1 discloses a pipe fitting for use in coupling metallic pipes and comprising a housing having therein a grip-ring, pipe support means downstream of the grip-ring in the direction of pipe insertion, sealing means downstream of the pipe support means, and means limiting movement of the sealing means in said pipe insertion direction, with the pipe support means as well as the limiting means being formed integrally with the housing. This leads to a complicated housing shape.

A press fitting is known from EP 1 593 899 B1 with a socket housing in addition to a gripping ring and a sealing ring, a spacer, or separating ring. The drawback of the known press fitting is the necessity of a spacer.

SUMMARY AND INITIAL DESCRIPTION

In at least one embodiment, described herein is a press fitting comprising a socket defining at one end an opening for the insertion of an end of a tube, a sealing ring within the socket, and a gripping ring within the socket, arranged in front of the sealing ring in the direction of insertion of the tube. Also described herein is a joint assembly with such a press fitting having a tube inserted therein.

Embodiments described herein further develop known press fittings and save costs by omitting a spacer. This is achieved in that the gripping ring is provided with at least two weakening features, in some embodiments in form of notches, being reducible in size by deforming the gripping ring when applying a pressing action on the socket such that the inner diameter of the gripping ring is reduced.

According to the present disclosure, it is preferred that the weakening features extend, preferably equally spaced, around the inner diameter and/or the outer diameter of the gripping ring, in particular in pairs of two opposing weakening features.

In addition, the weakening features extend substantially axially and the present disclosure proposes that the inner diameter of the gripping ring is chosen to be larger than the outer diameter of the tube prior to reducing the size of the weakening features when applying a pressing action.

With the present disclosure, it is proposed that the weakening features comprise notches that are at least partially closed when applying a pressing reaction.

It is also beneficial that the weakening features of the gripping ring around the inner diameter are provided with chamfer angles at their tube facing side, with the chamfer angle A1 preferably being at most 45°.

With the present disclosure, it is also proposed that gripping edges of the gripping ring are provided by teeth of the gripping ring around the inner diameter D2 of the gripping ring and each tooth being defined between two neighbouring weakening features provided around the inner diameter D2 of the gripping ring, with a gripping angle of each gripping edge preferably being greater than 45°.

It is proposed by the present disclosure that the gripping ring is arranged within a recess of the socket together with the sealing ring or within a recess of the socket separate from the recess of the socket for the sealing ring or within a broadened mouth of the socket separate from the recess of the sealing ring.

According to the present disclosure, it is preferred that the gripping ring and the sealing ring are arranged next to each other within the same recess, preferably having a substantially rectangular cross section, with the face of the gripping ring facing towards the sealing ring forming a sealing ring abutment with an abutment angle A3 relative to the inner surface of the socket within the recess of 90°±10°, preferably substantially 90°.

It is also proposed that the sealing ring is arranged within a cavity defined by the recess of the socket, the gripping ring and the tube.

Embodiments of the present disclosure can be characterized in that the gripping ring is provided with at least one projection for engaging a groove within the socket, and/or the gripping ring is provided with a split.

It is preferred that the sealing ring has an outside diameter D3 that is chosen to be larger than the inside diameter of the recess and/or an inside diameter D4 that is chosen to be larger than the tube outer diameter and/or a width L16 that is chosen to be larger than either the width of the cavity defined by the width L18 of the recess of the socket minus the width L17 of the gripping or the width of the separate recess of the socket.

Further embodiments of the present disclosure are characterized in that the sealing ring has a first portion or face facing towards the recess of the socket that is defined by a substantially rectangular cross section, preferably with smoothened edges, and/or the sealing ring has a second portion or face facing towards the tube that is defined by a substantially triangular cross section with smoothened edges and/or forming a projection, and/or the cross section of the sealing ring is symmetrical to a plane perpendicular to its axis and/or substantially triangular with smoothed edges.

It is advantageous according to the present disclosure to form the sealing ring such that the sealing ring, in particular having a substantially triangular cross section, is provided with at least one recess, preferably two recesses, and/or at least one projection, preferably three projections on its first face facing the recess of the socket and facing away from the tube.

With the present disclosure, a joint assembly with a press fitting according to the invention and a tube inserted into the press fitting is also provided.

DESCRIPTION OF THE DRAWINGS

Embodiments of the present disclosure will now be described by way of example, with reference to the accompanying drawings, in which:

FIG. 6a is a front elevation view of the gripping ring of FIG. 2;

FIG. 6b shows a projected section through A-A of FIG. 6a;

FIG. 10a is a front elevation view of the sealing ring shown in FIG. 1;

FIG. 10b shows a projected section through A-A of FIG. 10a;

DETAILED DESCRIPTION

Figure 1:
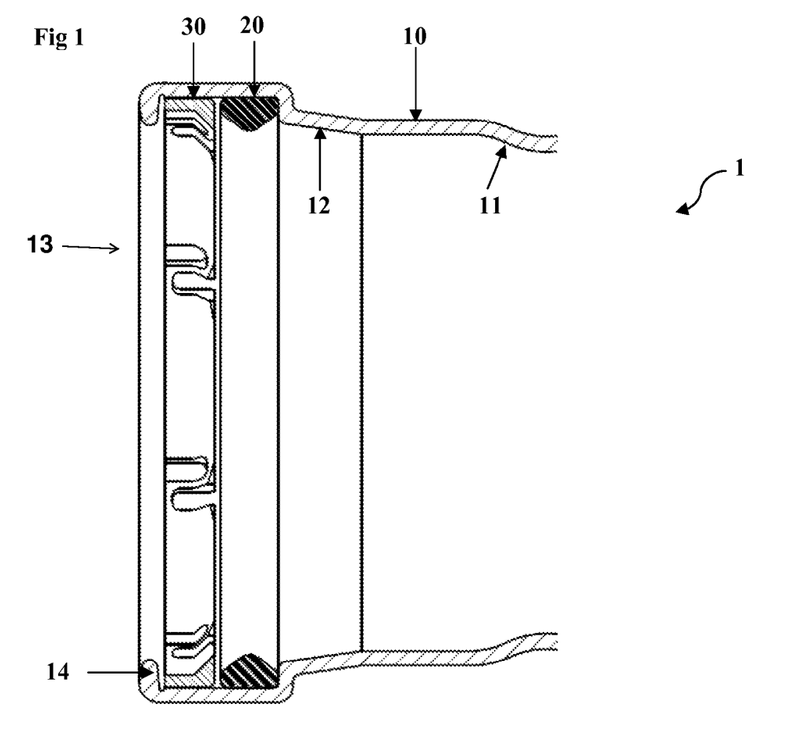
FIG. 1 is a longitudinal cross-sectional view of a press fitting of the present disclosure.

FIG. 1 illustrates a cross section through a press fitting 1 of the present disclosure prior to the application of a pressing action. The press fitting 1 comprises a socket 10 designed to accept a tube (not shown) and, after a diametric reduction by a pressing tool (not shown), to provide a gas/water tight joint with said tube having a sealing ring 20 as well as a gripping ring 30 arranged between the socket 10 and the tube.

The socket 10, preferably being a metal socket 10 of known structure, may be incorporated into fittings as to provide directional variation, diameter reduction of tube, or jointing to threaded connections. It is provided with a step 11 for stopping the introduction of the tube, a taper 12 to facilitate the introduction of the tube, which will be at least partly diminished when applying a pressing action for closing the joint assembly, and a recess 13 for housing, in the direction of the tube insertion, at first the gripping ring 30 and behind the gripping ring 30 the sealing ring 20, with a flange 14 of the socket 10 at the open mouth thereof securing the gripping ring 30 as well as the sealing ring 20 within the recess 13.

No spacer as utilized in known technology is required. An explanation of the technical reasoning behind the omission of a spacer is described later. The use of two parts only between the socket 10 and the tube of a fitting of this type is novel.

Figure 2:
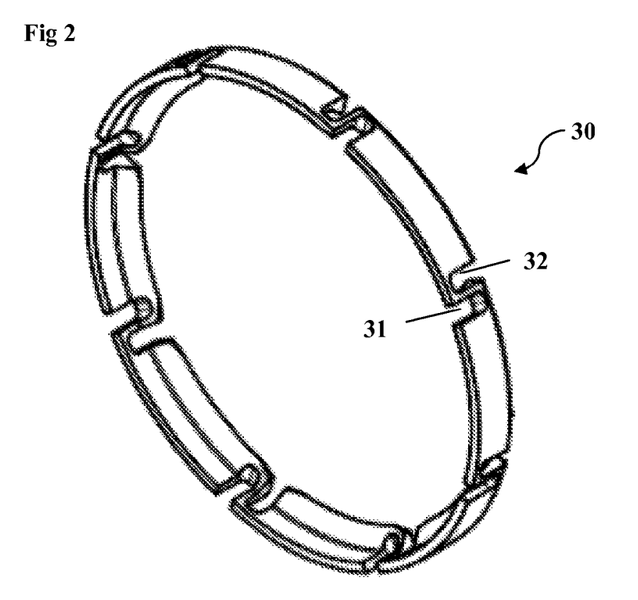
FIG. 2 is a perspective view of the gripping ring shown in FIG. 1.

The gripping ring 30 is more clearly illustrated in FIG. 2. A plurality of deliberately weakened sections, provided in the form of notches 31, 32, preferentially equally spaced, extend around the diameter of the gripping ring 30 and are provided to reduce the force needed during the pressing action to reduce the diameter of the joint assembly. During pressing, the notches 31, 32 of the gripping ring 30 are deformed allowing diameter reduction. This diameter reduction induces engagement of the inner edge of the gripping ring 30 and the inserted tube. The design maintains even distribution of the engagement between the tube and the gripping edge around its diameter.

The illustrated version of FIG. 2 shows a specific form of weakening sections. There could be other variations that are effective to varying degrees. The use of such forms to provide an effective diameter reduction without the use of forces beyond the capabilities of a readily available pressing tool is principal to the present disclosure.

Figure 3A:
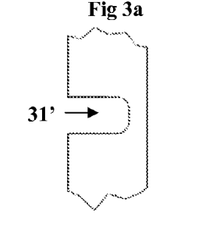
FIGS. 3a, 4a, and 5a show front elevation views of different weakening features of a gripping ring to be used in a press fitting of the present disclosure.
Figures 3B, 4A:
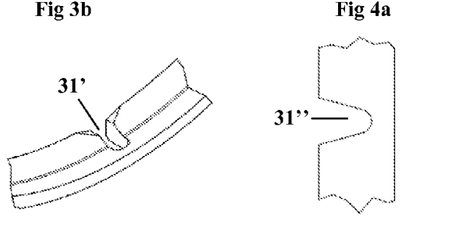
FIGS. 3b, 4b, and 5b show isometric details of the weakening features of FIGS. 3a, 4a, and 5a, respectively.
Figure 4B:
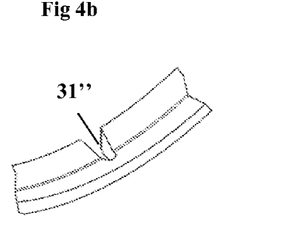
Figure 5A:
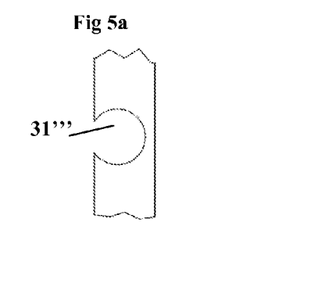
Figure 5B:
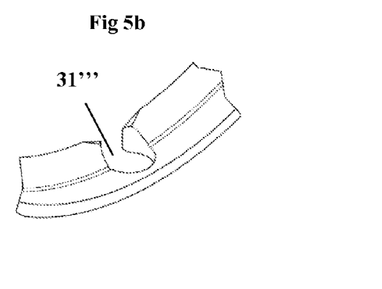

Variations of the notches 31 to 31''' are illustrated in FIGS. 3a, 4a, 5a and their related isometric details in FIGS. 3b, 4b, and 5b. In these instances, the notches of no particularly specified shape are used to create weak points in the gripping ring 30. In instances of FIGS. 3a, 4a, and 5a the notches 3', 31'', and 31''' are shown on one edge of the gripping ring 30. It is also possible that notches are provided by opposed pairs or arranged as shown in FIG. 2.

The material of the gripping ring 30 chosen for its hardness qualities and corrosion resistance is stainless steel although other materials with suitable hardness and corrosion resistance, either inherent or added via coatings, may be usable. The hardness of the material is critical to provide sufficient penetration of the gripping edge into the inserted tube and also provide resistance to deformation of the edge when tensile forces are applied due to pressurization of the completed joint.

It is also conceivable that such a configuration could be split at a chosen point around the diameter of the gripping ring 30 and still function effectively.

The gripping mechanism is now explained in further detail with reference to FIGS. 6a to 8b.

Figures 6A, 6B:
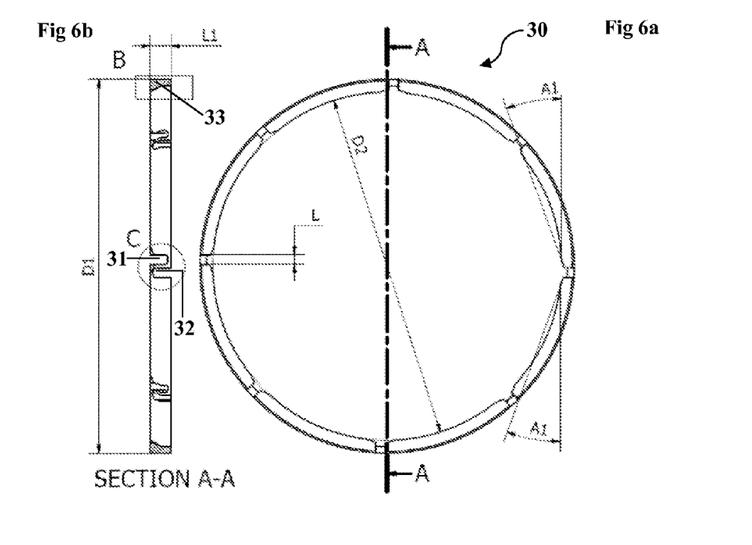

FIG. 6a is a front elevation view of the gripping ring 30 of FIG. 2, and FIG. 6b illustrates a projected section through A-A of FIG. 6a. The gripping ring 30 is designed as follows:

D1 and D2 are the outer and inner diameters of the gripping ring 30, respectively. D1 is chosen to fit within the socket recess 13, whereas D2 is chosen to be smaller than the outer diameter of an incoming tube to ensure a tight joint as explained later.

L1 is the length of the gripping ring 30 in the tube insertion direction and is chosen to be of sufficient length to prevent section rotation when tensile forces are applied to the joint assembly.

A1 are chamfer angles provided to reduce circumferential engagement with the tube during pressing and thus reduce forces required. The chamfer angle can be around 20° and should not exceed 45°.

Rectangle B in FIG. 6b highlights a section through the main part of the gripping ring 30 and shows a gripping edge or rather tooth 33 facing the tube in a joint assembly. The tooth 33 is shown enlarged in FIG. 7 with its gripping angle A2. The gripping angle A2 has proven to be advantageous to be greater than 45°. At 45° or less, the interior gripping edge can be distorted to cause joint failure when tensile forces induced by pre-determined test pressures are applied. It is of course possible to use smaller angles A2 if harder materials were used but would imply greater costs. Also, where lesser tensile forces are encountered, the necessity for a greater degree of inclusive angle A2 is reduced.

Figure 7:
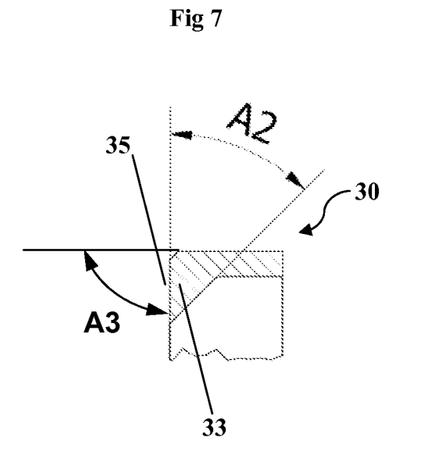
FIG. 7 is an enlarged view of FIG. 6b in the region of rectangle B.

The gripping ring is provided with a face 35 best shown in FIG. 7 next to the sealing ring 20. This face 35 together with the recess 13 defines a cavity for holding the sealing ring 20 in position. In order to avoid a migration of sealing ring material outside that cavity, in particular within the region of the gripping ring 30, the face 35 extends substantially radially, being in the vertical direction in the FIGURES. Thus, the face 35 forms an abutment face with an angle A3 to the recess 13 of around 90°.

Circle C in FIG. 6b highlights a weakening section in the form of two opposing notches 31 and 32.

L is the gap between neighbouring teeth 33 on the gripping or seal side of the gripping ring 30.

Figure 8A:
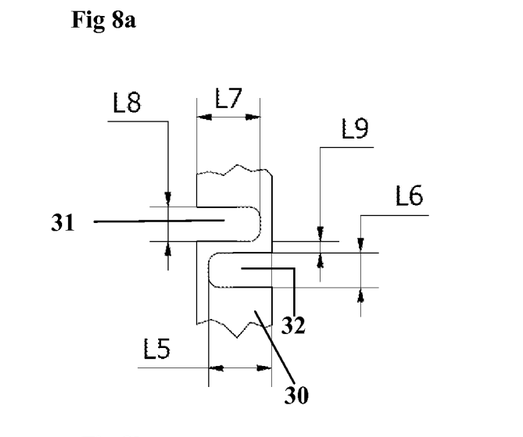
FIG. 8a is showing two opposing notches of the gripping ring of FIG. 6b in the region of circle C.
Figure 8B:
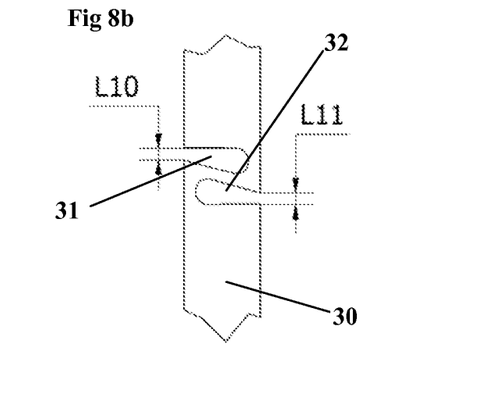
FIG. 8b is showing the two notches of FIG. 8a after the application of pressure when forming a tight joint assembly of the present disclosure.

The lengths L5 to L9 defining the opposing notches 31 and 32 of the gripping ring 30 and shown in FIG. 8 a encourage collapse of the gripping ring diameter. The one notch 31 has a radial length L7 and an axial length L8 and the other notch 32 has a radial length L5 and an axial length L6, with the two notches being separated by a length L9 in an axial direction. During a pressing operation, the forces implied on the joint assembly cause the notches 31 and 32 to collapse to adopt a form as shown in FIG. 8b with axial length L10 and L11 being smaller than L8 and L6, respectively. The reduction of the length L6 (L8) to a lesser value L11 (L10) is also beneficial for preventing any possible high pressure extrusion of the sealing means through any of the gaps L.

The radial alignment of the inner gripping edges of the teeth 33 and the outer edges of the gripping ring 30 facing the socket 10 is maintained during the distortion. This is beneficial to both the seal and the engagement of the tube. The space in which the seal needs to operate is not violated and the maintenance of the radial alignment of the teeth 33 provides a consistent force to retain the tube under pressure-induced tension.

Next, the special design of the sealing ring 20 of the present disclosure is described with reference to FIGS. 9 to 11.

The use of an O ring is known in press fittings. But the socket shape with a substantially rectangular recess 13 is not ideally suited to such an O ring. Although the radial inner length L12 of the recess 13 shown in FIG. 9 is chosen to provide desired compression of the sealing ring, it is not sufficient to prevent potential for an O ring displacement during tube insertion if an O ring of a diameter equivalent to (or greater than) L14 is used, with L14 being greater than L12. This has led in the past to development and inclusion of particular spacer parts to prevent O ring displacement.

For seals to function correctly, the cross-sectional area of the recess 13 must provide at least an equivalent area of the sealing ring 20, and it has to be taken into consideration that the gripping ring 30 has some limited linear movement in the unpressed joint condition and therefore could move to a position where, if an O ring was utilized, the necessary cross-sectional area is encroached upon. Previous designs have answered this problem with special spacers.

Figure 9:
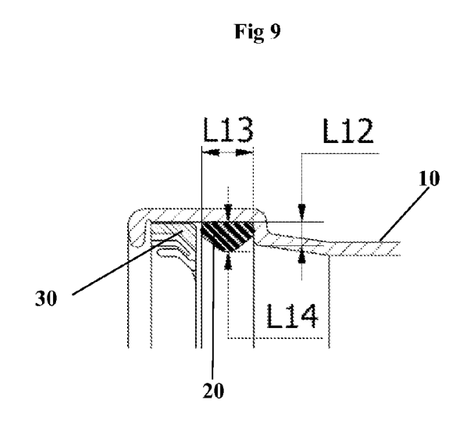
FIG. 9 is a part view of FIG. 1.

The arrangement of FIG. 9 dispenses with the need for such spacers.

Localized distortion in the form of tube diameter reduction may occur in the immediate vicinity of the gripping edges. In the instance of an O ring being used, the O ring could migrate, either before pressing or via pressure-induced movement after pressing, to the reduced tube area adjacent to the gripping edges. This could result in joint failure via leakage of the interior medium. With the seal shape of the present disclosure, this is avoided.

Figures 10A, 10B:
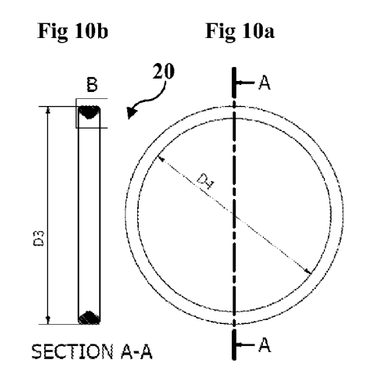
Figure 11:
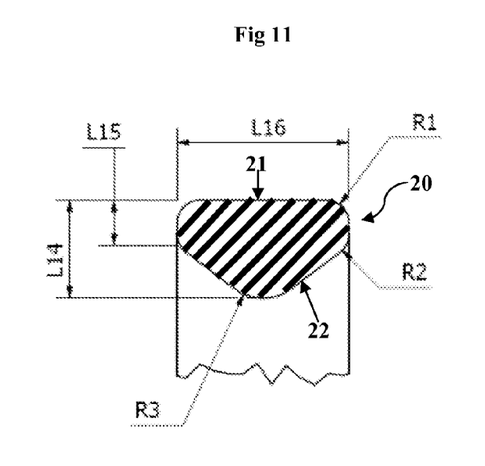
FIG. 11 is a cross-sectional view of the sealing ring of FIG. 10b in the region of rectangle B.

The shape of the sealing ring 20 utilized according to the present disclosure and shown best in FIGS. 10a to 11 is self regulating to provide sufficient area for seal function after pressing and is designed as follows:

The sealing ring 20 has an outside diameter D3 that is chosen to be, in all instances of tolerance, larger than the inside diameter of the recess 13. This ensures the provision of an outwardly radial force that encourages the sealing ring 20 to remain in its location. The inside diameter D4 of the sealing ring 20 depends on D3 and L14 but in all instances is smaller than the tube outer diameter.

The sealing ring 20 has two different portions or faces, a first face 21 facing towards the recess 13 and a second face 22 facing towards the tube. The first face 21 is defined by a substantially rectangular cross section with smoothened edges (see lengths L15 and L16 as well as radii R1 and R2 in FIG. 11) to fit within the recess 13. The second face 22 is chosen to assist in the prevention of seal displacement and has a substantially triangular cross section with smoothened edges (see radii R2 and R3 in FIG. 11) forming a projection with a length L14-L15. If a tube upon insertion is inserted at an angle to the main axis of the socket 10, the effect of tube edge contact with face 22 is to urge the sealing ring 20 radially outwards thus preventing seal displacement. In this instance, the sealing ring 20 is symmetrical to prevent accidental incorrect assembly, losing this facility.

Length L13 in FIG. 9 or L16 in FIG. 11 defines the width of the sealing ring 20 or rather of its first face 21 and is chosen to provide sufficient distance between the teeth 33 or rather its gripping edges of the gripping ring 30 and the sealing ring 20 or rather its central radius R3 within the recess 13.

Furthermore, the shape of the seal described above provides greater seal-to-tube and seal-to-socket contact areas than would be the case in the instance of an O ring being used. This provides a more secure sealing means. In parallel operating conditions, the seal would provide greater longevity due to the greater sealing area employed. Particularly, in larger size fittings where the cost of replacement is considerably higher than that of smaller diameter fittings, this is a considerable advantage.

FIGS. 12 to 16 illustrate a joint assembly of the present disclosure with a tube 5 inserted.

Figure 12:
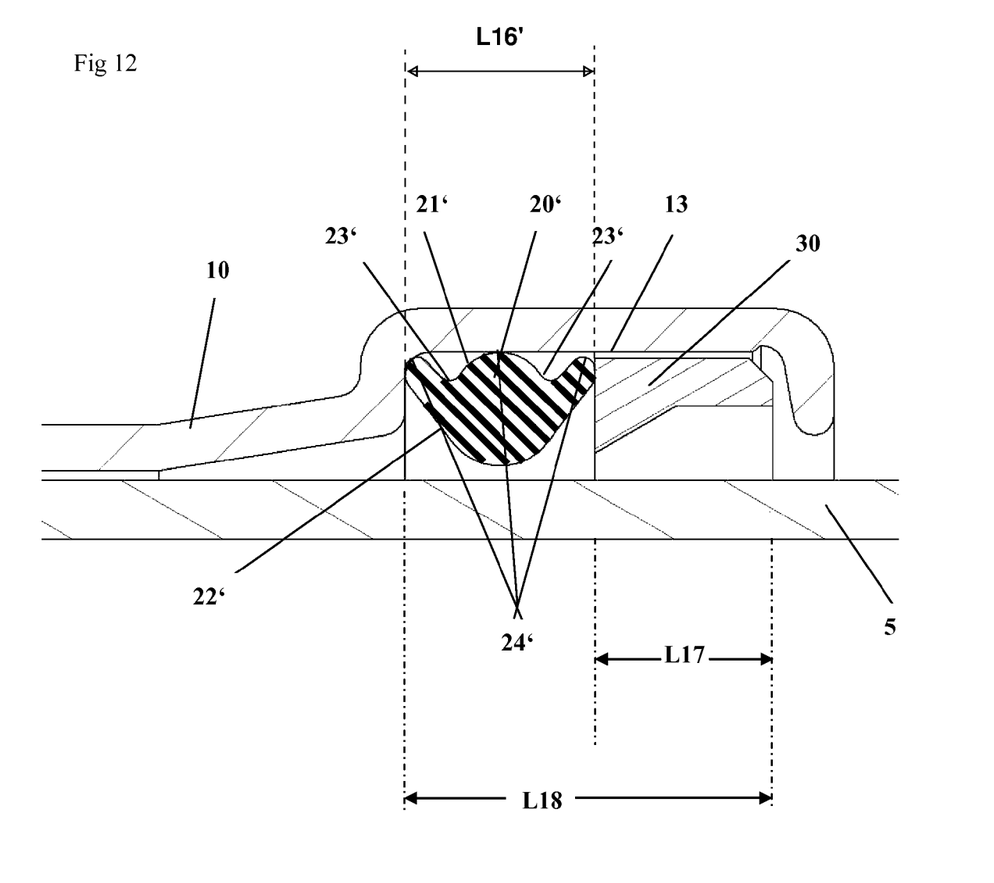
FIGS. 12-16 are part cross sections of different joint arrangements of the present disclosure.

FIG. 12 depicts a joint assembly with the socket 10 housing a special sealing ring 20' as well as the gripping ring 30 within its recess 13 for engagement with the tube 5. The sealing ring 20' has a substantially triangular cross section with smoothed edges, in other words having no sharp edges, and two recesses 23' between three projections 24' on its first face 21' facing towards the recess 13 of the socket 10. The sealing ring 20' does not have a perfectly triangular cross-section because of the recesses 23' but has a substantially triangular cross section because the recesses 23' indent one side of the triangle. Referring back to the previous embodiment illustrated in FIGS. 10a and 10b, the sealing ring 20' also has an inside diameter (not illustrated) like the inside diameter D4 and an outside diameter like the outside diameter D3. Choosing the outside diameter of the sealing ring 20' to be larger than the inside diameter of the recess 13 of the socket 10, and the inside diameter of the sealing ring 20' to be smaller than the outer diameter of the tube 5 will lead to the material of the sealing ring 20' substantially closing the cavity provided for the sealing ring 20' applying a pressing action to the assembly for securing the same. Also, the sealing ring 20' has a width L16' that extends from the edge of the first projection 24' to the edge of the last projection 24', and choosing the width L16' of the sealing ring 20' to be larger than the difference between the width L18 of the recess 13 and the width L17 of the gripping ring 30 will lead to the material of the sealing ring 20' substantially closing the cavity provided for the sealing ring 20' when applying a pressing action to the assembly for securing the same. In fact, the sealing ring 20' is able to better fill the cavity defined by the socket 10 with its recess 13, the gripping ring 30, and the tube 5 optimizing its sealing function with the design depicted in FIG. 12.

Figure 13:
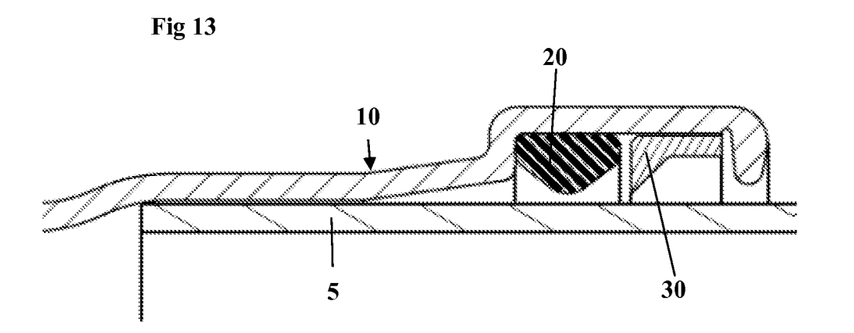
Figure 14:
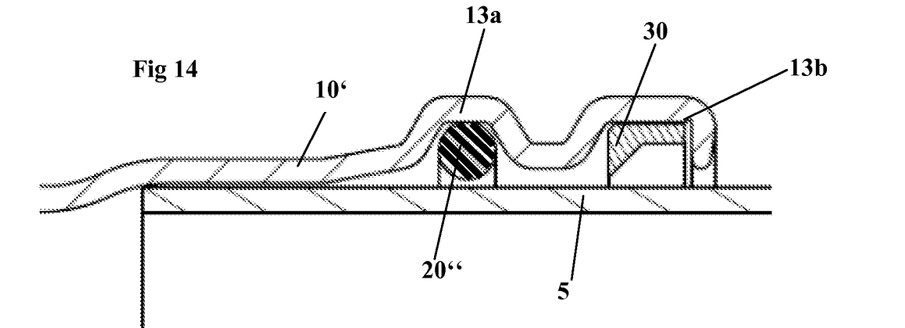
Figure 15:
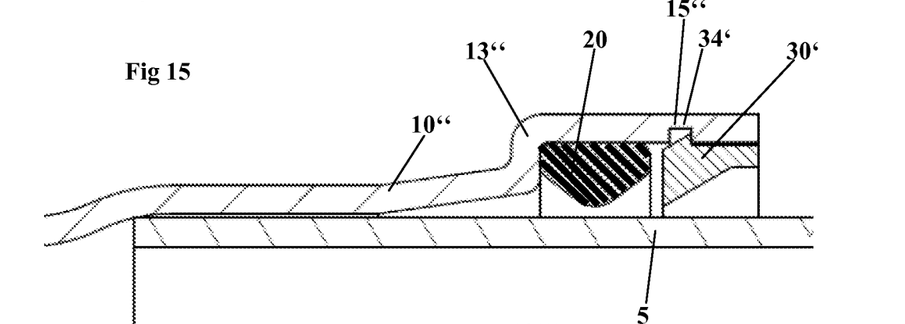
Figure 16:
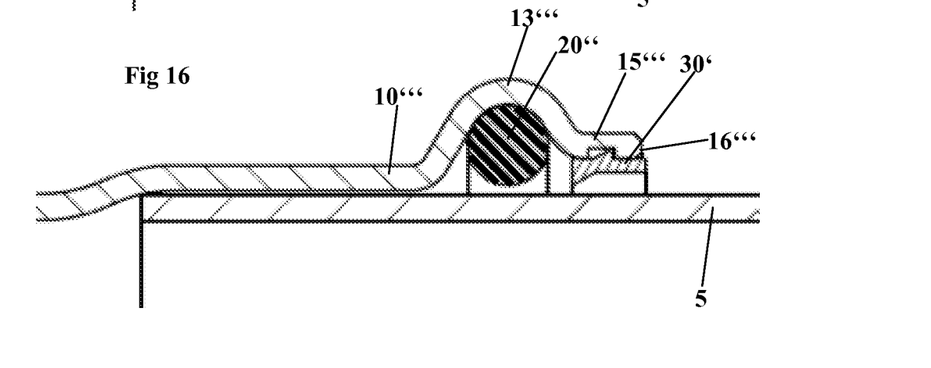

FIG. 13 shows the usage of the press fitting of FIG. 1 together with the tube 5 to provide a joint arrangement. FIG. 14 illustrates the usage of the gripping ring 30 having the design shown in FIG. 2 in a different socket configuration having two recesses 13a and 13 b, one recess 13 a provided for a sealing ring 20", and the other recess 13b provided for the gripping ring 30, and making usage of a common O ring. FIG. 15 illustrates the usage of a gripping ring 30' differing from the one of FIG. 2 by the addition of an outwardly raised portion or projection 34' to engage in an internal circumferential groove 15" of the socket 10" to provide a secure engagement and positioning. The inherent spring function of the gripping ring 30', caused by its weakening features, will be urged into the desired position during assembly, such that the socket 10" does not need a flange to hold the gripping ring 30' at the desired position. FIG. 16 illustrates the use of a similar gripping ring 30' as in FIG. 15 within a different press socket profile having a recess 13''' for an O ring 20'' and opened mouth 16''' without a flange, but with a recess 15''' for engaging the gripping ring 30'.

The features disclosed in the claims, the specification, and the figures may be important for the claimed invention, taken separately or in any combination, for the invention in the respective different embodiments.

REFERENCE SIGN LIST 1 press fitting
5 tube
10, 10', 10", 10''' socket
11 step
12 taper
13, 13a, 13b, 13", 13''' recess
14 flange
15", 15''' groove
16''' mouth
20, 20', 20" sealing ring
21, 21' first face
22, 22' second face
23' recess
24' projection
30, 30' gripping ring
31, 31', 31", 31''' notch
32 notch
33 tooth
34' projection
35 face
A1, A2, A3 angle
D1-D4 diameter
L6-L18 length
L gap
R1-R3 radius The embodiments of the invention in which an exclusive property or privilege is claimed are defined as follows:

1. A press fitting comprising:
   a socket defining at one end an opening for insertion of an end of a tube;
   a sealing ring within the socket; and
   a gripping ring within the socket, arranged in front of the sealing ring in a direction of insertion of the end of the tube,
   wherein the gripping ring is provided with at least two weakening features that are reducible in size by deforming the gripping ring when applying a pressing action on the socket such that an inner diameter D2 of the gripping ring is reduced,
   wherein the gripping ring comprises a sealing ring facing side and an opposite side, and one of the at least two weakening features extends from the sealing ring facing side towards the opposite side without reaching the opposite side, and another of the at least two weakening features extends from the opposite side towards the sealing ring facing side without reaching the sealing ring facing side, and
   wherein the at least two weakening features extend from an inner surface of the gripping ring defining the inner diameter D2 to an outer surface of the gripping ring defining an outer diameter D1 and cutting though both the inner surface and the outer surface.

2. The press fitting according to claim 1, wherein the at least two weakening features extend around the inner diameter D2 and the outer diameter D1 of the gripping ring.

3. The press fitting according to claim 2, wherein the at least two weakening features comprise at least four weakening features that are equally spaced around the inner diameter D2 and the outer diameter D1 of the gripping ring in pairs of two opposing weakening features.

4. The press fitting according to claim 1, wherein the at least two weakening features extend substantially axially, and the inner diameter D2 of the gripping ring is chosen to be larger than an outer diameter of the end of the tube prior to reducing the size of the at least two weakening features when applying a pressing action.

5. The press fitting according to claim 1, wherein the at least two weakening features comprise notches that are configured to be at least partially closed in response to applying a pressing action.

6. The press fitting according to claim 1, wherein the at least two weakening features of the gripping ring are positioned around the inner diameter D2 of the gripping ring and provided with chamfer angles A1 at a tube facing side, with the chamfer angles A1 being at most 45°.

7. The press fitting according to claim 1, wherein gripping edges of the gripping ring are provided by teeth around the inner diameter D2 of the gripping ring and each tooth is defined between two neighboring weakening features provided around the inner diameter D2 of the gripping ring, with a gripping angle A2 of each gripping edge being greater than 45°.

8. The press fitting according to claim 1, wherein the gripping ring is arranged within a recess of the socket together with the sealing ring.

9. The press fitting according to claim 8, wherein the gripping ring and the sealing ring are arranged next to each other within the same recess with a face of the gripping ring facing towards the sealing ring forming a sealing ring abutment with an abutment angle A3 relative to an inner surface of the socket within the recess of 90°±10°, preferably substantially 90°.

10. The press fitting according to claim 9, wherein the sealing ring is arranged within a cavity defined by the recess of the socket, the gripping ring, and the end of the tube.

11. The press fitting according to claim 9, wherein the abutment angle A3 relative to the inner surface of the socket within the recess is substantially 90°.

12. The press fitting according to claim 8, wherein the sealing ring has a width L16 that is chosen to be larger than a width of the cavity defined by a width L18 of the recess of the socket minus a width L17 of the gripping ring.

13. The press fitting according to claim 8, wherein the sealing ring has a first face facing towards the recess of the socket, and a second face facing towards the end of the tube that is defined by at least one of a substantially triangular cross section having a curved projection.

14. The press fitting according to claim 13, wherein the sealing ring having a substantially triangular cross section and the curved projection is provided with at least one recess on its first face facing the recess of the socket and facing away from the end of the tube.

15. The press fitting according to claim 14, wherein the sealing ring is provided with two recesses.

16. The press fitting according to claim 14, wherein the sealing ring is provided with three projections.

17. The press fitting according to claim 13, wherein the substantially triangular cross section is without any sharp edges.

18. The press fitting according to claim 1, wherein the gripping ring is provided with at least one projection for engaging a groove within the socket.

19. The press fitting according to claim 18, wherein the gripping ring is provided with a split.

20. A joint assembly comprising:
a press fitting according to claim 1; and
a tube inserted into the press fitting.

* * * * *